Jan. 26, 1943.  W. HECHT  2,309,391
DEVICE FOR INJECTIVELY TREATING PLANTS
Original Filed April 29, 1938
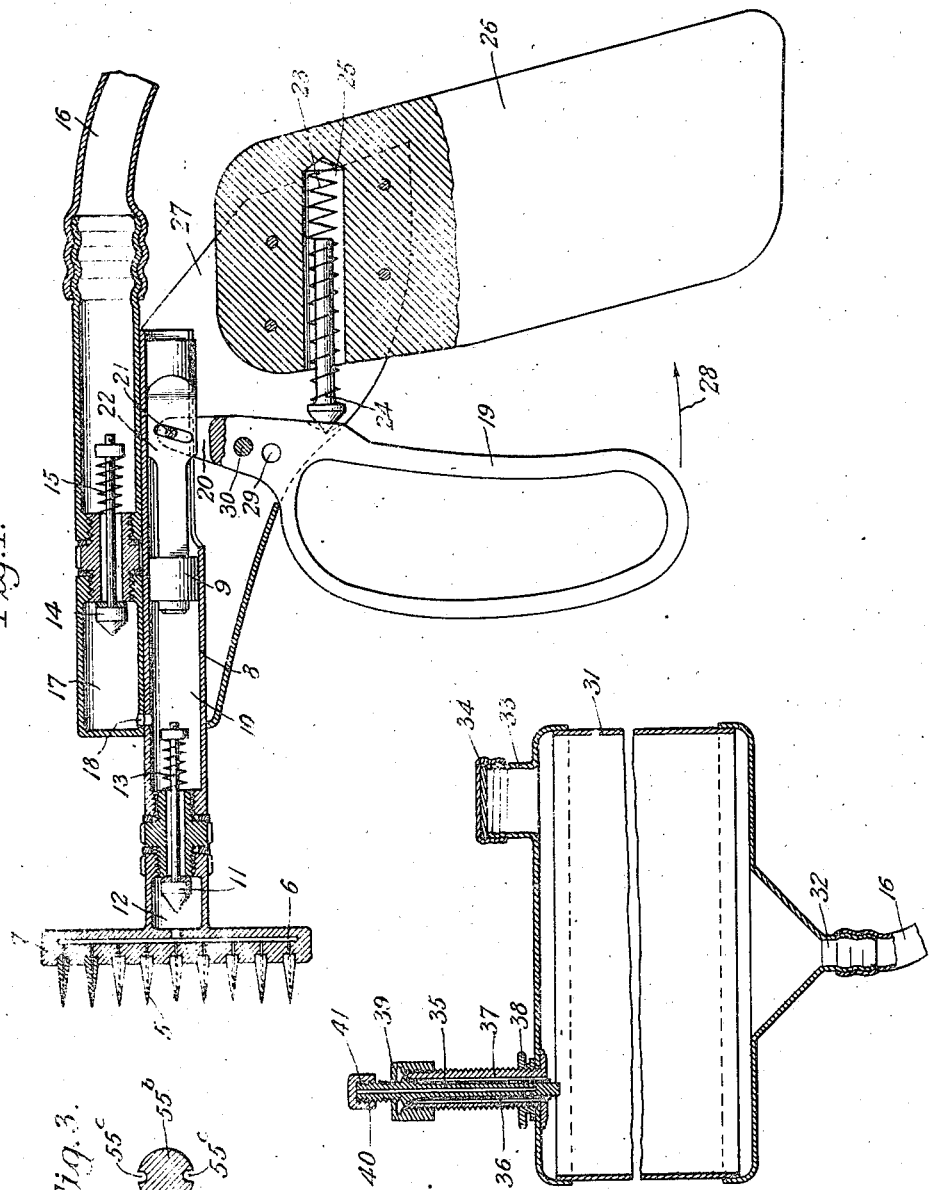
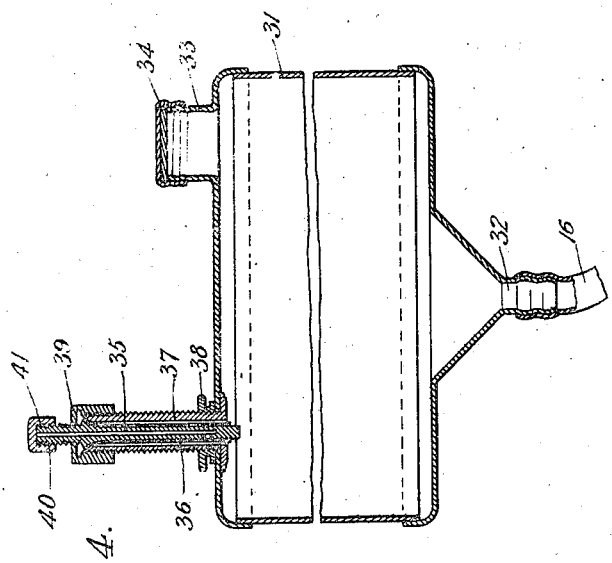
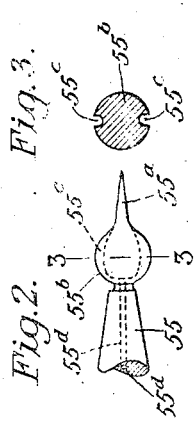
Inventor
WALTER HECHT
By Dowell & Dowell
Attorneys Patented Jan. 26, 1943

2,309,391

UNITED STATES PATENT OFFICE 2,309,391

DEVICE FOR INJECTIVELY TREATING PLANTS

Walter Hecht, Loka Pri Zidanemostu, Jugoslavia; vested in the Alien Property Custodian Original application April 29, 1938, Serial No. 205,104. Divided and this application April 11, 1941, Serial No. 388,188. In Austria and Bulgaria April 30, 1937

14 Claims. (Cl. 47—57.5)

This invention relates to devices for injecting substances into plants and aims to provide an improved device or apparatus for artificially fertilizing or germinating (i. e. infecting) plants. It constitutes a divisional part of the invention described in my co-pending prior application Serial No. 205,104, filed April 29, 1938, (now U. S. Letters Patent No. 2,261,368 dated November 4, 1941) for Method of treating plants to produce artificial or abnormal growths, for which this application is filed as a division of said prior application.

Said invention is intended to give practice to the method of the aforesaid prior application and has as its object the provision of means for producing, in particular, artificial or abnormal growths, such as fruits, parasites, symbiotic organisms and the like on living plants, said growths being adapted for use for nutritive and technical purposes, as for instance in or for the production of pharmaceutical goods, i. e. ergot on rye. However, it is applicable to the injection of plants or other growths for other purposes. It is further contemplated to use the improvement for the production of new fruits, grains or the like, through cross-breeding in a systematic and rational way under ordinary field-production conditions.

In order to secure a field or acreage production of such growths upon a large scale, the device or apparatus, according to the invention, consists in part of puncturing needle-like means which can be operated in a very simple manner to penetrate the tissues of living plants and to introduce thereinto any desired germ carrying liquid or liquids, such as vaccine containing ergot spores.

An object of the invention is to provide a simple device for performing the intended described work, which is easy and convenient to handle in use.

Another object of the invention is to provide such a device which can be inexpensively constructed and will be inexpensive to use for the intended purpose of injecting germ-carrying liquids or the like, such as a coloring matter, into different plant growths. In this connection, it is to be noted that the claimed device will be economical in the use of the liquid which it supplies from a reservoir or storage container under controllable regulation, eliminating the likelihood of leakage with resultant wastage of the liquid.

Other objections, as well as the broad concept and particular advantages of the invention, will be stated or made to appear in the following specification with reference to the attached drawing, illustrating one practicable embodiment of the invention in a convenient form by way of example.

In said drawing:

Fig. 1 is a longitudinal section representation of the device embodiment, made in the form of a pistol carrying needles as the puncturing and injecting means;

Fig. 2 is an enlarged detail view illustrating a modificational form of the needles constituting a part of the device of Fig. 1;

Fig. 3 is a cross-section of Fig. 2, taken on the line 3—3 thereof; and

Fig. 4 is a cross-sectional view of a storage container for the germ-carrying liquid which may be connected to the device of Fig. 1 for continuously supplying the same.

In the illustrative embodiment, having reference first to Fig. 1, 5 indicates a plurality of pricking means consisting of hollow needles, and 6 indicates a distributing passage in a head plate 7 to which said needles are attached. This pricking-means fitting or part of the device is interchangeably mounted as by screwing on one end of a cylinder 8, which together with the plunger 9 constitutes a pump, the output of which at each stroke may constitute a charge or the quantity of liquid required for a single injection into a plant. A working space 10 of this communicates around a pressure valve 11 with an antechamber 12 in front of said working space 10, which said antechamber 12 leads to the distributing passage 6. A spring 13 automatically closes the valve 11, when the pressure is released. A suction valve 14, which is closed automatically by a spring means 15, is located adjacent (above) the cylinder 8 in the passage between the feed tube 16, leading from a supply vessel (later described) and a chamber 17 which communicates through an aperture 18 with the working space 10 of the pump. The cubical capacity of the chamber 17 preferably corresponds to a multiple of single charges or quantity of liquid which may be delivered on each working stroke of the pump. Accordingly, there will always be in the chamber 17 a certain amount of excess liquid which ensures continuous working of the device in the event of an interruption or delay in the feed from the storage vessel.

For the operation of the plunger 9, an actuating member 19 is provided, which is pivoted at 30. A shorter lever arm 20 of said actuating member 19 is operatively connected at 21 with a rod 22 that connects to the pump plunger 9. A spring which resiliently presses the actuating member 19 and the plunger 9 in the initial operating position is shown at 23 in Fig. 1. This spring 23, with a guiding pin 24, is mounted in a recess 25 of a handle part 26. Preferably, as is illustrated in Fig. 1, the device is made in the form of a pistol, with the handle 26 butt-shaped like a pistol grip and with the actuating member 19 constituting a trigger-like element, the head plate 7 with the picking needles 5 being mounted at the forward end of the cylinder 8 forming a barrel-like part. A metal plate 27 in this instance connects the handle 26, advantageously made of wood, with the cylinder 8. The cylinder, pumping means and other parts of the pump, including the head plate and pricking means, are all advantageously made of metal.

If the chamber 17 and the cylinder or barrel 8 are charged with the germinal liquid and the device is directed against the plant in such a way that the needles 5 are inserted into the tissues of the plant to be treated, then actuation of the actuating member 19 in the direction of the arrow 28, towards the handle 26 (like pulling the trigger of a pistol), will cause the plunger 9 to displace the quantity of liquid required for a single charging of the needles 5 and thereby presses the germinal liquid into the tissue of the plant. When the actuating member 19 is released, the tensioned spring 23 effects the return movement of the parts 19 and 9 to the initial position shown in Fig. 1. During this return movement of the plunger 9, liquid is drawn up into the chamber 17, which is connected to the working space 10 by the aperture 18, around the open suction valve 14 from the pipe 16 and the connected supply vessel or storage container previously mentioned, said container being attached to said pipe 16, as indicated but not actually shown by Figs. 1 and 4. Adjustable means are provided for the regulation of the quantity of liquid drawn in and delivered. Said means consists of two or more holes 29 arranged at varying distances from the pivot 21 connecting the lever arm 20 with the rod 22. By changing the position of the pivoting pin 30 from one to the other of these holes, the ratio between the lever arms of the trigger-like actuating member 19 may be altered in a simple manner.

The injecting needles in the head plate 7 of the device may be variously constructed, the only essential requirement being that they are able to receive and retain the requisite quantity of the germinal liquid used. In the modification illustrated in Figs. 2 and 3, the pricking means consists of an element 55 having a prong tip 55$^a$, an enlarged or bulbous head 55$^b$, and longitudinal grooves 55$^c$ on the periphery of the latter for the reception and retention of the requisite quantity of liquid to be used in treating the plants, said grooves 55$^c$ communicating with the distributing means 6 of the injecting device through a feed channel 55$^d$ similarly to the hollow needles 5 in Fig. 1.

The separate container attached for supply of the germinal liquid may comprise a tank 31 such as shown in Fig. 4, the same being equipped with means for putting the contents under pressure, for the purpose of ensuring continuous and steady flow of the feed to the device. Said tank is advantageously made of metal and formed with an outlet nozzle 32 for connection with the tube 16, the latter being preferably of flexible material such as rubber, and leading direct to the injecting device. In the cover of said container, a filling nozzle or neck 33 is provided, which is adapted to be closed by means of a screw cap 34. The tank also has means for putting its contents under pressure, which, in the present instance, consists of a valve similar to the valve of a bicycle tire. This is shown to comprise an inner valve member 35 sheathed in a short rubber tube 36, which is inserted in the valve stem 37 connected to the tank 31 by a nut 38. A screw cap for securing the inner valve member 35 in position is represented at 39. The connecting branch or nipple 40 of the valve member 35 is provided with screw threading. After unscrewing a cap 41 thereon, a pump, such as a bicycle pump, may be connected to the branch or nipple 40, and thereby the air above the liquid inside of the container 31 may be put under pressure.

The means used for putting the germinal liquid under pressure within the storage tank may of course comprise some other suitable device or facility, and may be attached at any other part of the tank, such as at or to the closure cap 34.

The device of the invention is simple and reliable in construction, is convenient to hold in the hand, and enables the work of pricking and infecting the plants to be effected rapidly and with entire accuracy of aim. Said device may be used as follows: The operator, passing from plant to plant in the breeding ground or field, grasps and introduces the germinal matter into selected plants as required by pressing the needles into the stalk or branch thereof deep enough to penetrate the tissues, and then operating the actuating member to force the liquid into said tissues through said needles. Performing this operation by one hand, the operator has his other hand available to grasp and hold a suitable counter-support behind the stalk or branch, which counter-support will preferably be in the form of a pad.

The principal advantage of the inventive apparatus resides in the fact that the germinal matter can thereby be introduced at the desired point or place into the interior of the plant tissue by the puncturing or pricking operation. This greatly increases the reliability with which the desired effect will be achieved. Inasmuch as by the new apparatus the fertilization may be effected before the blossom develops or opens, the time available for the fertilization is very considerably longer and may often be many times greater than if prior known means of such injection were to be used.

A particular advantage of the invention resides in the fact that by a plurality of pricking means it is possible to introduce germinal matter into the plant simultaneously at several points. The result of such injection at several points will be that, in the first place, the probability of the germinal matter actually reaching the tissue to be fertilized or infected is increased, and therefore the chances of fertilization or infection being effected become greater, while, in the second place, it becomes possible to perform fertilization or infection at several points in the tissue simultaneously, so that the yield is increased while the amount of work involved is decreased.

It will be understood that although the new device is described herein as an expedient for carrying out certain specific methods for the treatment of plants, as set forth in my aforesaid parent application Serial No. 205,104, (now U. S. Letters Patent No. 2,261,368, dated November 4, 1941), it is not so limited, nor is it intended to be so construed, since the device can be used for carrying out any other injecting operation or process.

It will be obvious that various changes in form, arrangement and combination of the elements of the injecting device can be made to suit different conditions without departing from the actual scope of this invention, so that the appended claims are not intended to limit the same to the specific form or arrangement as hereinbefore described and illustrated.

Having thus described my invention, what I claim as new and desire to secure by Letters Patent of the United States is:

1. A device for injectively treating plants, comprising in combination a combined pricking and injecting means of needle-like form, supplying and controlling means for the feed of a plant treating liquid to be introduced into the tissues of the plants through said pricking and injecting means, the said supplying and controlling means including passages and valves and being connected with said pricking and injecting means, and a manually actuated member operatively connected with said supplying and controlling means, the said actuated member being adapted to limit the amount of the plant treating liquid that can be injected into the tissues of the plants at any single operation.

2. A device for injecting liquid into plants in the treatment thereof, comprising in combination a plurality of hollow needles serving as combined pricking and injecting means for the introduction of a germ-carrying liquid into the tissues of plants to be treated, a distributing means for said liquid in direct connection with the hollows of said needles, a pumping device connected with said distributing means, supplying means for said liquid connected with said pumping device, and a manually actuated member operatively connected with said pumping device, said actuating member being adapted to be adjusted in such manner that the charge of liquid delivered to said needles for introduction into said tissues at each operation can be varied.

3. A device for injecting liquid into plants in the treatment thereof, comprising in combination a plurality of grooved needles serving as combined pricking and injecting means for the introduction of a germ-carrying liquid into the tissues of the plants to be treated, a distributing means for said liquid in direct connection with said grooved needles, a pumping device connected with said distributing means, supplying means for said liquid connected with said pumping device, and a manually actuated member operatively connected with said pumping device, said member being adapted to be adjusted in such manner that the charge of liquid delivered to said needles and introduced into the plant tissues at each operation can be varied.

4. A device according to claim 2, in which the pumping device constitutes a plunger pump and said plunger pump has adjustable means for limiting its plunger movement, whereby the pump charge at each stroke can be varied.

5. A device according to claim 3, in which the combined pricking and injecting needles each comprises a bulbous head part containing at least one groove, and a prong tip attached to said bulbous part onto which said groove discharges.

6. A device for injecting liquid into plants in the treatment thereof, comprising in combination a plurality of hollow needle-like members adapted to penetrate the tissues of plants to be treated and to introduce a germ-carrying liquid thereinto, a distributing means for said liquid in direct connection with the hollows of said needle-like members, a pumping device connected with said distributing means, supplying means for said liquid connected with said pumping device, an antechamber located in the liquid passage between said pumping device and said distributing means, a pressure valve at the inlet of said antechamber adapted to open when the liquid is pumped into the antechamber and to close the antechamber when the liquid pressure therein is released, and a manually actuated member operatively connected with said pumping device.

7. A device for injecting liquid into plants in the treatment thereof, comprising, in combination, a plurality of hollow needles serving as combined pricking and injecting means for the introduction of a germ-carrying liquid into the tissues of plants to be treated, a distributing means for said liquid in direct connection with the hollows of said needles, a pumping device connected with said distributing means, supplying means for said liquid connected with said pumping device, a chamber located in the liquid passage between said supplying means and said pumping device, a suction valve at the inlet of said chamber, an orifice connecting said chamber with the pumping device, and a manually actuated member operatively connected with said pumping device.

8. A device for injecting liquid into plants in the treatment thereof, comprising in combination a plurality of hollow needles combined as pricking and injecting means for the introduction of a germ-carrying liquid into the tissues of the plants to be treated, a distributing means for said liquid in direct connection with the hollows of said needles, a pumping device connected with said distributing means, supplying means for said liquid connected with said pumping device, an antechamber located in the liquid passage between said pumping device and said distributing means, a pressure valve at the inlet of said antechamber adapted to open when the liquid is pumped into the antechamber and to close the antechamber when the liquid pressure therein is released, a chamber of much larger capacity than said antechamber located in the liquid passage between said supply means and said pumping device, a suction valve at the inlet of said chamber, an orifice connecting said chamber with the pumping device, and a manually actuated member operatively connected with said pumping device.

9. Apparatus for treating plants having the form of a pistol, comprising in combination a butt-shaped handle, a trigger-like actuating member, a barrel constructed as a pump adapted to be operated by said actuating member, at least one pricking and injecting needle disposed in front of said barrel, and supplying means for a germ-carrying liquid to said pump and to said needle, said needle being adapted to prick the tissues of plants and to introduce said germ-carrying liquid into them upon actuation of said pump.

10. A device for injecting liquid into plants in the treatment thereof, comprising in combination a plurality of hollow needles constituting combined pricking and injecting means for the introduction of a germ-carrying liquid into the tissues of plants to be treated, a head plate carrying said needles, a distributing means in said head plate for said liquid in direct connection with the hollows of said needles, a pumping device connected with said distributing means, supplying means for said liquid connected with said pumping device, and a manually actuated member operatively connected with said pumping device adapted to press said germ-carrying liquid through said needles into the tissues of plants upon actuation of said actuated member.

11. A device for injectively treating plants in the form of a pistol, comprising in combination a butt-shaped handle and a trigger-like actuating member, a barrel-like element, a plunger pump formed as a part of said barrel-like element, supplying and controlling means for a germ-carrying liquid to said pump, said means being included in said barrel-like element, a plunger rod operatively pivoted to said actuating member and adapted to be operated thereby, a spring in said butt handle in contact with said actuating member adapted to press said actuating member and said plunger rod in the initial operation position, a plurality of combined pricking and injecting needles adapted to penetrate the tissues of plants and introduce said germ-carrying liquid into the same, a head plate in front of said barrel-like element carrying said needles, and distributing means in said head plate communicating with said needles for the supply and distribution of said germ-carrying liquid to said needles.

12. A device according to claim 11, wherein said actuating member constitutes a double lever, there being at least two holes in the same at different distances from the pivoting point of the plunger rod, a pivot pin connected to the pistol body adapted to fit into either of said holes in an interchangeable manner, whereby the length of the lever arm of the actuating member and thereby the stroke of the plunger can be varied.

13. A device for injectively treating plants, comprising in combination with at least one combined pricking and injecting means of needle-like form, supplying and controlling means for the feed of a germ-carrying liquid to be introduced into the tissues of the plants to be treated by said pricking and injecting means, said supplying and controlling means being connected with said pricking and injecting means, an actuating member operatively connected with said controlling means, which is adapted to limit the amount of said germ-carrying liquid injected into said tissues at each operation, a separate storage container for the germ-carrying liquid, a tube or pipe connected with said container for communicating with said supplying means, and a pressure valve in said storage container adapted to be connected with a pressure means for applying pressure to the interior of said container.

14. A device according to claim 13, wherein the storage container is provided with a valve for applying pressure therein to the supplied liquid, said valve being of ordinary bicycle tire valve type.

WALTER HECHT.